Figure 1:
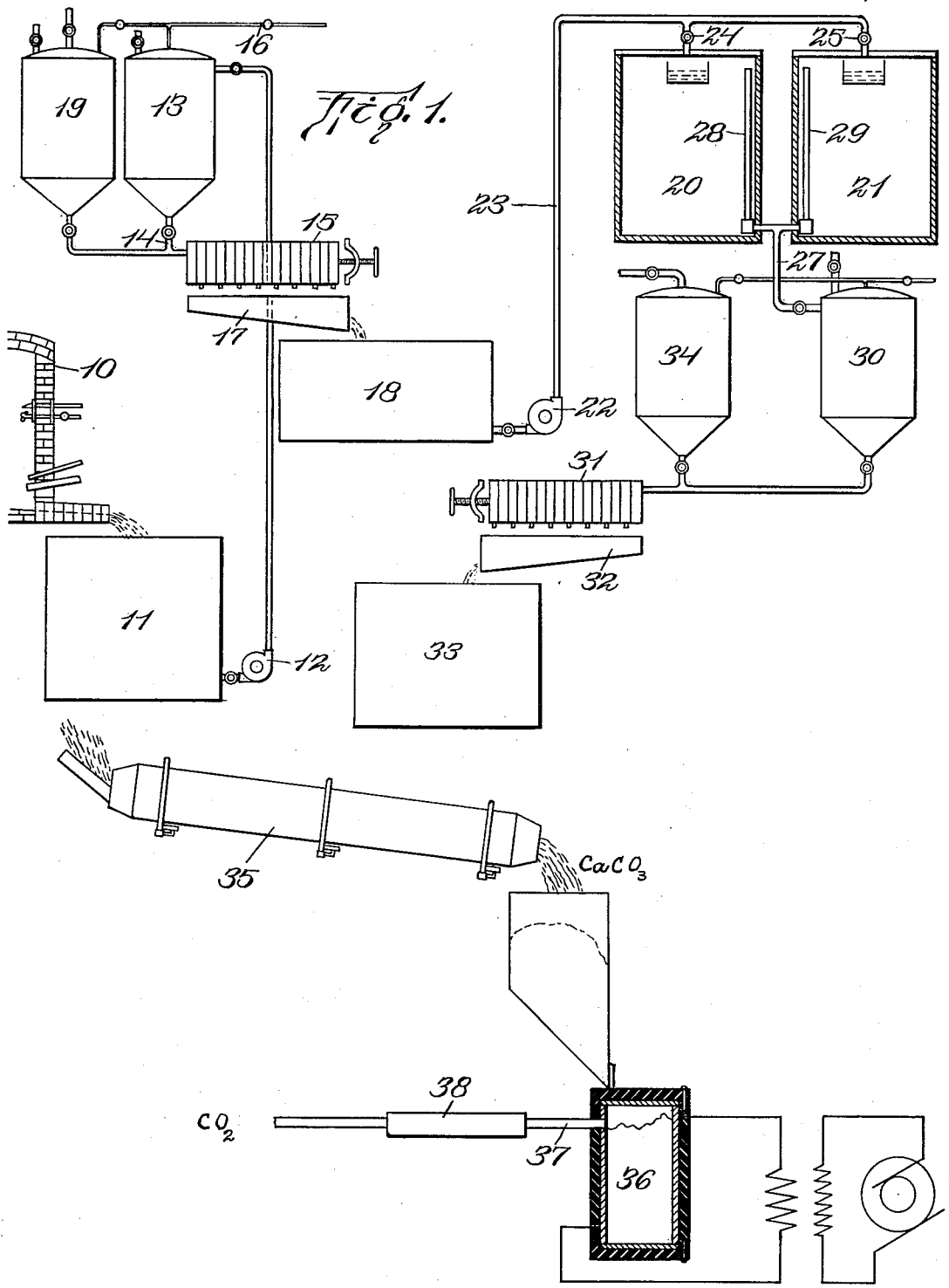

H. K. MOORE.
RECOVERING VALUABLE CONSTITUENTS FROM WOOD PULP DIGESTER LIQUOR.
APPLICATION FILED AUG. 14, 1913.

1,324,920. Patented Dec. 16, 1919.

Witnesses:
A. L. Folsom.
F. R. Roulstone.

Inventor:
Hugh K. Moore

UNITED STATES PATENT OFFICE.

HUGH K. MOORE, OF BERLIN, NEW HAMPSHIRE, ASSIGNOR TO BROWN COMPANY, OF PORTLAND, MAINE, A CORPORATION OF MAINE.

RECOVERING VALUABLE CONSTITUENTS FROM WOOD-PULP DIGESTER LIQUOR.

1,324,920.     Specification of Letters Patent.     Patented Dec. 16, 1919.

Application filed August 14, 1913. Serial No. 784,802.

*To all whom it may concern:*

Be it known that I, HUGH K. MOORE, a citizen of the United States, and resident of Berlin, in the county of Coos and State of New Hampshire, have invented certain new and useful Improvements in Recovering Valuable Constituents from Wood-Pulp Digester Liquor, of which the following is a specification.

This invention has relation to the manufacture of sulfate and soda pulp from wood. It has for its object to produce a more perfect wood pulp, free from lime, sand and other impurities, than has been possible.

It has further for its object the saving of the alkali which has heretofore been thrown away as waste in the lime sludge; and moreover to secure a marked economy in the operation of the mill by dispensing with the necessity of washing the sludge in the causticizing tanks. The invention has further for its object to shorten the time of the processes in the alkali room, to secure a uniformity in time and operation in causticizing the liquor from the dissolving tank to which the smelted soda is delivered from the smelting furnace, and to secure the elimination of the impurities in the dissolving tank liquor and the saving of the alkali which has heretofore been wasted with those impurities.

Furthermore the invention has for its object the recovery of the lime which is used for causticizing the carbonate, in such manner that the carbonic acid also obtained can be easily recovered and used in the arts.

In a co-pending application Serial No. 784,801, filed August 14, 1913, I have described a process by which the lignin or black liquor is concentrated and the carbonaceous residuum burned in a combined boiler and smelter furnace. The smelted soda, comprising sodium sulfid and sodium carbonate, with small amounts of sodium sulfate, is discharged into a dissolving tank containing water or a weak alkaline solution. With the molten soda are discharged certain impurities, to wit, the products of disintegration of the furnace, such as pieces of brick, soapstone, or other lining, sodium silicate, sodium aluminate, free carbon, iron sulfid, etc. Ordinarily these impurities are removed from time to time, say once a week, and with their removal much alkali is wasted.

According to my present invention the contents of the dissolving tank are subjected to a filtering operation from which the filtrate contains the soluble matter such as the sodium sulfid, caustic soda, sodium hydrosulfid, sodium carbonate and sodium sulfate, with only traces of the other constituents of the liquor. The sludge or residue from the filter press is washed to obtain any alkali contained therein, and is then thrown away as waste.

The soluble filtrate is conducted to causticizing tanks, where calcium oxid is added in the required amount to change the sodium carbonate to caustic soda, as follows:

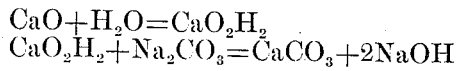

$$CaO + H_2O = CaO_2H_2$$
$$CaO_2H_2 + Na_2CO_3 = CaCO_3 + 2NaOH$$

The contents of each causticizing tank are passed through a filter press for filtering out the alkali, including caustic soda, sodium sulfid, sodium sulfate, and sodium hydrosulfid. The carbonate of lime which remains in the press is then dried by any suitable method, and is decomposed in an electric furnace of suitable construction from which the products, oxid of lime and carbon dioxid, are obtained. The lime is re-used in causticizing the sodium carbonate in the alkali room; and the gas, which contains small amounts of carbon monoxid, is passed through an oxidizing agent to change the monoxid to dioxid, and is then cooled, compressed, liquefied and stored in the usual cylinders or containers for shipment, and may be used for charging liquors, aging beer, or other purposes.

Thus it will be seen that the carbon which is combined in the soda, as carbonate, is obtained from the lignin content of the wood employed in making the pulp, and this same carbon in the form of $CO_2$ is recovered from the carbonate first by its combination with the lime, in making the caustic soda, and then by the decomposition of the calcium carbonate. The lime which is used in the causticizing process is likewise recovered, with but little loss, and may be used over and over again.

On the accompanying drawing I have illustrated conventionally and diagrammatically apparatus which may be utilized in carrying out my process. It will be understood that in making the sulfate or soda pulp the usual instrumentalities for digesting the raw material, for separating the pulp from the black liquor, for concentrating the black liquor and for spraying the concentrated black liquor in the presence of radiant heat, may all be as illustrated in my said co-pending application hereinabove identified and need not be herein described.

On the drawing I have illustrated at 10 a furnace in which the concentrated black liquor is sprayed and the residuum burned, and in which the greater part of sodium sulfate is reduced to sodium sulfid. The molten effluent from the furnace, which comprises not only soda in its various forms, but also the products of disintegration of the furnace and other impurities, is discharged into a tank indicated at 11. This tank contains water, or a weak alkaline solution. The sodium sulfid breaks up into caustic soda and sodium hydro-sulfid, while the sodium carbonate passes into the solution without change, as does the sodium sulfate. After the tank 11 has been charged, the entire contents thereof are forced by a pump 12 into a closed tank or montejus 13. The lower end of this tank is connected by a conduit 14 with a filter press of usual construction, there being connected with the tank 13 an air pipe 16 by which sufficient pressure upon the contents of the tank may be exerted to force the sludgy mass into the various portions of the filter press. From the filter press the solution which contains sodium hydroxid, sodium carbonate, sodium hydrosulfid, sodium sulfate and sodium sulfid, is discharged from the filter press into a trough 17, from which it is collected in a tank 18. In order that the filter press may be washed for the removal of all of the soda, I employ preferably an additional tank or montejus 19, which may be connected with the filter press. All of the sludge which remains in the filter press after being washed is removed and thrown away as waste. This contains about all of the lime silicates, iron sulfid, carbon and other foreign matter which find their way into the dissolving tank. The filtrate in the tank 18 may now be causticized and to this end I employ causticizing tanks such as indicated at 20, 21. The filtrate is forced from the tank 18 by a pump 22 through conduit 23 having valve branches 24, 25, to either of the tanks which is to be charged. Suspended in the usual baskets in these causticizing tanks is a body of lime, calcium oxid, which is slaked by the water of the filtrate into calcium hydroxid. The carbonate of soda and the calcium hydroxid undergo the reaction previously pointed out in this specification for the production of calcium carbonate and caustic soda.

Preferably the causticizing tanks are heated to a temperature of approximately 200° F. before the lime is added. The contents of the causticizing tank are tested to determine the needed lime, sufficient lime being added after testing to completely change the carbonate of soda into caustic soda. The entire contents of the tank may now be withdrawn, including the calcium carbonate. This mixture is siphoned or discharged through a conduit having branches 28, 29, extending into a montejus 30 similar to that at 19, and from thence it is forced through a filter press 31 of usual construction. This filter press retains the carbonate of lime, but permits all of the soda in solution to be discharged as filtrate into a trough 32 from which it is collected into a tank 33. The filtrate consists of an aqueous solution of sodium hydroxid, sodium hydrosulfid and small quantities of sodium sulfate and sodium sulfid, and is used in re-charging the digesters for cooking the next batch of raw material in the manufacture of the pulp.

The contents of the filter consist of substantially pure carbonate of lime, and has the appearance and feeling of chalk. I employ preferably a second montejus 34 with which the filter is washed before the contents thereof after filtration are discharged.

The carbonate of lime, $CaCO_3$, is first dried by any suitable form of drying apparatus such as conventionally shown at 35 at a temperature sufficient to drive out all the water without decomposing the lime. The dried lime is then placed in an electric furnace indicated conventionally at 36, and is subjected to an intense heat—over 900 degrees centigrade—to effect its decomposition with the consequent formation of carbon dioxid and calcium oxid. An electric furnace of any suitable character may be utilized for this purpose having a conduit as at 37 for the emission of the carbonic acid. This gas, which is at a high temperature, is passed through a tube or container 38 in which is placed a quantity of cupric oxid or other oxidizing agent so that whatever carbon monoxid is formed in the electric furnace is changed to carbon dioxid. By any suitable means the carbon dioxid is cooled, pressed and liquefied so that it may be stored in cylinders or containers for shipment. I have not illustrated any particular means for cooling, compressing, liquefying and storing the carbon dioxid, as various forms of instrumentalities may be used for these purposes such as are now manufactured. The calcium oxid which remains in the furnace is discharged from time to time, is slaked with water and is re-used in the causticizing tanks.

From the foregoing it will be seen that there is discharged as waste in the practice of my process only those materials which are practically valueless, and which, if permitted to remain in the liquor, effect a marked deterioration in the quality of the paper. By the first filter press I remove practically all of the various impurities which are discharged from the smelting furnace into the dissolving tank, including the silicates, some of which, though soluble, seem to remain in the press. Consequently there is no danger of the paper manufactured from the pulp being spotted by iron sulfide, etc. By using the second filter press for the contents of the causticizing tanks I insure the complete removal of any impurities which might pass with the filtrate from the first filter. One of the chief advantages which I secure by the employment of the filter press for the contents of the dissolving tank is that I permit no accumulation of sludge or other impurities in the causticizing tanks. In addition to securing a better pulp product, I provide for a recovery of the carbonate of lime for use in the causticizing tanks, and I obtain as a by-product, carbon dioxid, which has considerable value in the arts. This carbon dioxid is fixed finally as sodium carbonate in the furnace from the decomposition of the lignin soda soaps, so that a part of the carbonaceous matter which would otherwise be wasted is used in the manufacture of the carbon dioxid. That is to say the lignin in the digesters consists of various carbohydrates, the exact nature of which is not known. These all saponify with the soda forming various compounds such as sodium salts, and what might, roughly speaking, be called soaps, which are of complex character and more or less unstable. These compounds when subjected to the intense heat in the retort break down into sodium carbonate.

Preferably the decomposition of the calcium carbonate is secured by exposing it to an intense radiant heat, and this is accomplished by the use of an electric furnace. Ordinarily calcium carbonate is decomposed by "burning" or heating, either by an oil or gas flame or by passing the products of combustion of coal through the carbonate. In any event there is mixed with the carbon dioxid which is evolved, the products of combustion or other gases, the principal constituent of which is nitrogen, so that the carbon dioxid itself is lost because of the expense necessary to recover it therefrom. In my case, however, the calcium carbonate is decomposed by radiant heat without the admixture of any foreign matter and consequently the carbonic acid is given off in pure condition, such carbon monoxid as is evolved being oxidized subsequently, as previously explained herein. The radiant heat necessary to effect the decomposition of the carbonate can be obtained in a retort the walls of which are externally heated to a point where they give off radiant heat of sufficient intensity to decompose the carbonate either by the heat generated by an electric current or heat generated in some other manner, although I prefer an electric furnace as herein stated, because of the ease with which it may be controlled.

It will be apparent from the foregoing that my invention may be practised in various ways. Various forms of instrumentalities may be used in carrying out the process and the process itself may be practised continuously, the recovered lime being utilized in causticizing the effluent of the furnace after its discharge into the dissolving tank.

I claim—

1. A process for recovering valuable constituents from wood pulp digester liquor, which comprises burning concentrated lignin liquor and smelting the soda therein, collecting said smelted soda in an aqueous solution, filtering said solution for the removal of impurities, adding lime to the alkaline filtrate to causticize the sodium carbonate, and filtering the causticized liquor for the removal of calcium carbonate.

2. A process for recovering valuable constituents from wood pulp digester liquor, which comprises smelting the inorganic content of such liquor, discharging into an aqueous solution the molten inorganic content resulting from such smelting, filtering said solution for the removal of impurities, adding lime to the alkaline filtrate to causticize the sodium carbonate, filtering the causticized liquor for the removal of calcium carbonate, and decomposing said calcium carbonate and recovering substantially pure calcium oxid.

3. A process for recovering valuable constituents from wood pulp digester liquor, which comprises smelting the inorganic content of such liquor, discharging into an aqueous solution the molten inorganic content resulting from such smelting, filtering said solution for the removal of impurities, adding lime to the alkaline filtrate to causticize the sodium carbonate, filtering the causticized liquor for the removal of calcium carbonate, decomposing the calcium carbonate for the production of calcium oxid and carbon dioxid, and recovering the carbon dioxid and substantially pure carcium oxid.

4. A process for recovering valuable constituents from wood pulp digester liquor, which comprises smelting the inorganic content of such liquor, discharging into an aqueous solution the molten inorganic content resulting from such smelting, filtering said solution for the removal of impurities, adding lime to the alkaline filtrate to causticize the sodium carbonate, filtering the causticized liquor for the removal of calcium carbonate, decomposing the calcium carbonate and recovering calcium oxid, and re-using said calcium oxid produced by such decomposition in causticizing more alkaline filtrate.

5. A process for recovering valuable constituents from wood pulp digester liquor, which comprises smelting the inorganic content of such liquor, dissolving said smelter content including sodium carbonate in an aqueous solution, filtering the solution for the removal of impurities due to such smelting, adding lime to the filtrate solution to causticize the sodium carbonate and form calcium carbonate, filtering the last-mentioned solution to remove the calcium carbonate, and decomposing the recovered calcium carbonate and recovering the carbon dioxid resulting from the decomposition.

6. A process for recovering valuable constituents from wood pulp digester liquor, which comprises smelting the inorganic content of such liquor, collecting the smelted inorganic content in an aqueous solution, filtering said solution for the removal of impurities caused by the smelting operation, adding lime to the alkaline filtrate to causticize the sodium carbonate, filtering the causticized liquor for the removal of calcium carbonate, and decomposing the calcium carbonate and recovering calcium oxid.

In testimony whereof I have affixed my signature, in presence of two witnesses.

HUGH K. MOORE.

Witnesses:
MARCUS B. MAY,
P. W. PEZZETTI.